May 19, 1931.  W. G. SAVIDGE  1,806,506
NUT LOCK
Filed Nov. 17, 1927
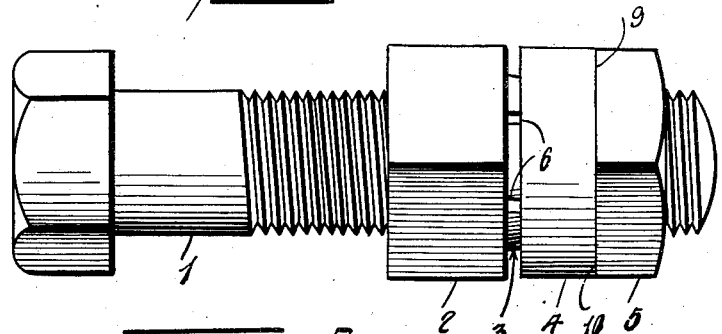
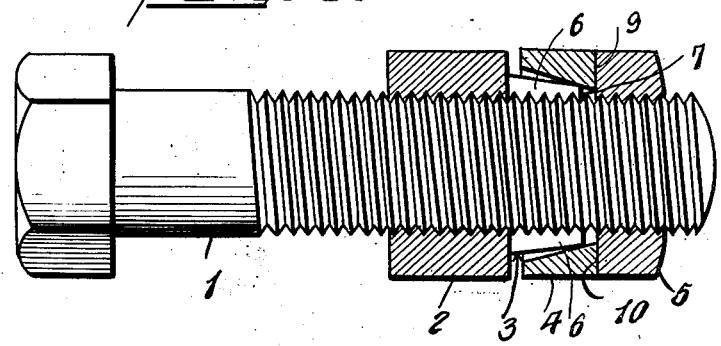
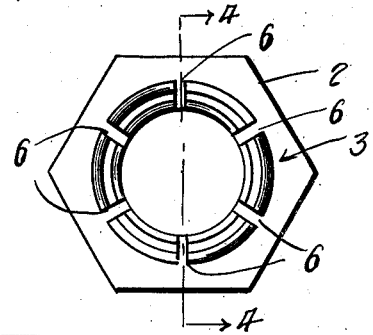
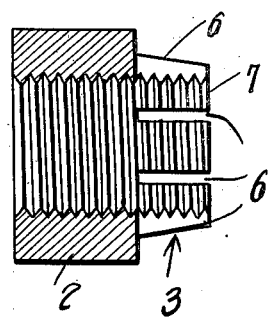
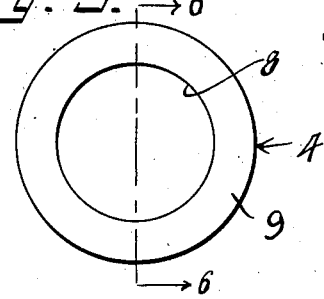
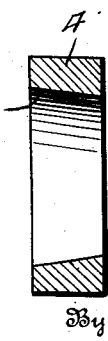
Inventor
W. G. Savidge.
By
Attorney Patented May 19, 1931

1,806,506

UNITED STATES PATENT OFFICE

WILLIAM G. SAVIDGE, OF SUNBURY, PENNSYLVANIA

NUT LOCK

Application filed November 17, 1927. Serial No. 233,795.

This invention relates to nut locks. The invention comprises a base nut having an integral frusto-conical projection at one end which is of smaller internal diameter at its base than the body of the nut and of substantial length, said projection being internally threaded and divided into a circular series of fingers by a plurality of radial slots which extend from the outer end of said extension to the body of the nut. The base nut may be of any suitable dimensions, but the conical projection is of smaller diameter than the nut and has a gradual taper in order that the fingers may have a desirable amount of resiliency. A lock ring is provided for compressing the ends of said fingers against the threads on the bolt to which the nut is applied, and this ring has a tapering bore large enough in diameter at one end to afford a clearance between the ring and the fingers in any locking position of the ring, and smaller in diameter at and near the other end than the outer end of the frusto-conical extension, or the outer end of the circular series of fingers formed by said extension. A jamb nut is also provided for forcing the lock ring on to said fingers to compress the finger ends against the bolt. With this construction, when the lock ring is forced on to the fingers its inner surface will bear upon the outer ends only of the fingers, where the locking force can be most efficiently applied. The nut lock can be applied and adjusted or removed without putting any torsional strain on the fingers, and after removal, the several parts can be used again in the same manner.

In the accompanying drawings,

Fig. 1 is a side elevation of the nut lock and a bolt to which it is applied;

Fig. 2 is a similar view of the bolt, with the nut lock shown in central longitudinal section;

Fig. 3 is a side view of the base nut, looking from right to left in Figs. 1 and 2;

Fig. 4 is a section on the line 4—4 of Fig. 3;

Fig. 5 is a side view of the lock ring, looking from right to left in Figs. 1 and 2; and, Fig. 6 is a section on the line 6—6 of Fig. 5.

In the drawings, 1 represents a bolt, 2 indicates the body of the base nut, 3 indicates the frusto-conical extension from the side of the nut, 4 indicates the lock ring, and 5 indicates the jamb nut.

The base nut and its frusto-conical extension are threaded internally to suit the threads on the bolt, and this extension has a plurality of radial slots 6, extending from its outer end to the body of the base nut, thus dividing said extension into a circular series of internally threaded fingers 7. The diameter of this extension adjacent the body of the nut is made considerably smaller than the diameter of the nut, in order to reduce the amount of metal in the fingers so that these fingers, which are of substantial length, will have a desirable amount of resiliency. The taper of the outer surface of the fingers is at a slight angle to the axis of the nut, and the lock ring 4 has a bore 8 which tapers at a somewhat greater angle to its axis than the taper of the fingers. The diameter of the bore in the lock ring adjacent its face 9 is smaller than the diameter of the frusto-conical extension at the outer ends of the fingers 7, while the diameter of the bore 8, at the opposite side of the lock ring, is great enough to provide clearance between this end of the bore and the fingers when the lock ring is forced on to the fingers, as shown in Fig. 2. Thus, when the parts are in position, as shown in the latter figure, the lock ring will bear against the outer ends of the fingers but will not bear against the fingers adjacent the body of the nut, or any other point than said ends.

In assembling the parts, the base nut is applied and tightened against the object which is to be gripped between it and the head of the bolt, and the lock ring is then placed over the fingers and the jamb nut is then applied and tightened against the lock ring which forces the threaded ends of the fingers tightly into engagement with the threads on the bolt. As the diameter of the bore in the lock ring is smaller at and near one end of the bore than the diameter of the smaller end of the frusto-conical projection, the ring, at this part, cannot ride over the ends of the fingers and must force these ends tightly into engagement with the threads on the bolt when the jamb nut is tightened. As the lock ring does not bear upon the fingers at any point except their outer ends, in any position of adjustment of the ring, it will be seen that the full compressive force is applied most advantageously. The faces 9 and 10 of the lock ring and jamb nut are preferably smooth, and when the jamb nut is tightened the frictional engagement between these parts, occasioned by the back pressure of the lock ring, prevents the jamb nut from jarring loose.

It will be evident that the device can be applied to a bolt and adjusted or removed therefrom without applying any tortional stress upon the fingers, and when removed the parts may be used again in like manner on other bolts.

What I claim is:

A nut lock comprising a base-nut having at one end an internally threaded frusto-conical projection of smaller diameter at its base than the body of the nut and of substantial length, said projection divided radially into a circular series of fingers tapering from the body of the nut to their outer ends, a lock ring having a tapering bore large enough in diameter at one end to afford clearance between said ring and said projection in any locking position of the ring and smaller in diameter at and near the other end than the diameter of the outer end of said projection, whereby when said ring is forced on to said fingers its inner surface will bear upon the outer ends only of the fingers in all locking positions, and a jamb nut adapted to engage the outer face of the ring to force the ring on to the fingers.

In testimony whereof I affix my signature.

WILLIAM G. SAVIDGE.